2,969,360
CONTINUOUS CHLORINATION OF CYANURIC ACID

Richard Howard Westfall, Westfield, N.J., assignor to Food Machinery and Chemical Corporation, New York, N.Y., a corporation of Delaware No Drawing. Filed Oct. 16, 1958, Ser. No. 767,509

4 Claims. (Cl. 260—248)

This invention relates to the manufacture of chlorinated cyanuric acid, and has as its principal object the provision of a method which will produce chlorinated cyanuric acids by the direct chlorination of aqueous cyanuric acid, in high yields, with minimum losses of reactants, and with minimum labor and operating costs.

Cyanuric acid —$C_3H_3O_3N_3$— is generally represented structurally either as

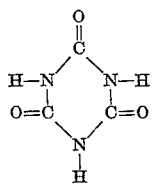

or

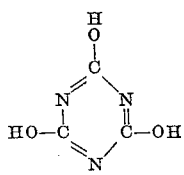

although the structure is probably an equilibrium between the possible forms. The preparation of the trichloro derivative, in which the three hydrogens are repla ed by chlorine, has been reported by Chattaway and Wadmore in J. Chem. Society, 81, 200 (1902); and the d chloro derivative, in which two of the hydrogens are replaced by chlorine, has been suggested as a source of active chlorine by Wilson and Lang, U.S.P. 2,171,901, September 5, 1939. More recently, a continuous process for making trichlorocyanuric acid has been suggested by Hands and Whitt, J. Soc. Chem. Ind., 67, 66–9 (1948). Considerable work has been done in the past few years on the utilization of these polychlorocyanuric acids as sources of active chlorine in dry bleach, dishwashing and sanitizing compositions.

The standard method of preparing trichlorocyanuric acid has been to dissolve the cyanuric acid in aqueous alkali solution, to produce a solution of alkali metal cyanurate; the cold mixture is chlorinated and the alkali metal is replaced by chlorine to yield the desired compound. In the continuous process suggested by Hands and Whitt, the cyanurate solution and chlorine are run counter-currently, through a tube reactor using radiant energy to speed up the chlorination.

Dichlorocyanuric acid has been made, in somewhat similar fashion, by chlorinating an alkali metal salt such as disodium cyanurate, in aqueous solution, with gaseous chlorine, and collecting the dichlorocyanuric acid which precipitates from the aqueous reaction mixture.

The chlorination of both disodium cyanurate and trisodium cyanurate, to dichlorocyanuric acid and trichlorocyanuric acid respectively, go very smoothly in small laboratory batches, and high yields are obtained. But as the batch sizes are increased, or as it is attempted to run the process continuously as suggested by Hands and Whitt, yields decrease or somewhat underchlorinated products are obtained. With batches above several pounds, it is possible to obtain completely chlorinated products by increasing the amount of alkali used above the theoretical, and by increasing the amount of chlorine used. With dichlorocyanuric acid, about a 15% to 20% excess of alkali is required; in making trichlorocyanuric acid, the required excess ranges from about 25% to 35%. The chlorine excess may be somewhat larger, involving both chlorine lost in reacting with alkali and chlorine lost in vent gases. Furthermore, yields based on cyanuric acid are lower than those obtained in small laboratory procedure, under the best conditions being only 60–70% for trichlorocyanuric acid and about 80% for dichlorocyanuric acid.

Not only do prior art processes give underchlorinated products and low yields in plant operations, but side reactions, which may involve the decomposition of the cyanuric acid with the evolution of $CO_2$ and $N_2$ and the consumption of caustic and chlorine, may also lead to the formation of inorganic chloramines, such as nitrogen trichloride. Excess caustic added in order to produce a fully chlorinated trichlorocyanuric acid promotes the unwanted side reactions, and it is possible for sufficient $NCl_3$ to be formed to cause a violent explosion.

It is the principal object of the present invention to provide a process of chlorinating cyanuric acid whereby yields approaching the theoretical are obtained, not only based on the cyanuric acid charged, but also based on the alkali and chlorine charged.

Another object of the invention is to provide means for controlling the chlorination of cyanuric acid so that pure dichlorocyanuric acid, pure trichlorocyanuric acid, or any predetermined mixture of the two can be obtained.

Still another object of the present invention is to produce the chlorocyanuric acids more economi ally on the basis of the labor and equipment used by providing a process which permits continuous operation.

Still a further object of the invention is to provide a process for chlorinating cyanuric acid in which side reactions are minimized, so that dangerous by-products are avoided.

These and other objects are obtained, in accordance with the present invention, by feeding cyanuric acid, the molar ratio of aqueous alkali to produce the d sired degree of chlorination, and chlcrine into a reaction zone maintained at a pH of 9 or lower, and continuing the feed to a final pH of between about 1.5 and 3.5, at which point the desired product precipitates and may be recovered.

Preferably, the reaction is carried out continuously and in two stages. In the first stage, aqueous alkali, cyanuric acid and chlorine are fed continuously into a reaction zone maintained at a pH between about 5 and 9, and most preferably between 6.5 and 8.5 at a temperature between 5° C. and 40° C. The reaction mixture, containing partially chlorinated product, is continuously removed from the reaction zone and fed into a second reaction zone with additional chlorine, the second reaction zone being maintained at a pH between 1.5 and 3.5 and a temperature between about 5° C. and 20° C. The product is continuously removed from the second reaction zone in the form of a slurry, and the desired solid product is separated from the slurry, washed and dried.

According to the instant invention, the surprising discovery has been made that the replacement of the hydrogens on the cyanuric acid by chlorine proceeds without serious side reactions, except in a very limited pH range, if only sufficient alkali be present to neutralize hydrochloric acid as it is formed in the chlorination reaction. There is a very minor amount of cyanuric acid decomposition at all pH's, resulting in a loss of the order of .5 to 1.5% of the cyanuric acid. However, in the pH range of 9 to 11 or higher, chlorine slowly oxidizes cyanuric acid according to the equation

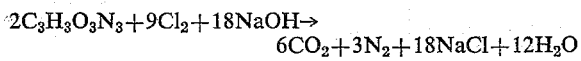

$$2C_3H_3O_3N_3 + 9Cl_2 + 18NaOH \rightarrow 6CO_2 + 3N_2 + 18NaCl + 12H_2O$$

The reaction is highly exothermic. It will be noted that nine equivalents of alkali and chlorine are consumed per mol of cyanuric acid.

In laboratory procedure following the disclosure of Chattaway and Wadmore, the reaction goes so rapidly through the sensitive pH range that little of the side reaction occurs. However, in large plant batches, the heat developed by the exothermic reaction makes it necessary, due to inadequate heat exchange, to prolong the holding time in the dangerous pH range. As a result, a small amount of cyanuric acid is oxidized, and a large amount of alkali and chlorine are used up; it should be noted that destruction of as little as 4% of the cyanuric acid will require an 18% excess of alkali and a 9% excess of chlorine when making dichlorocyanuric acid. Because of the difficulties involved in the pH range above 9, according to the instant invention the pH is maintained at 9 or below at all times.

Although a two stage continuous reaction is essential to obtain all the benefits of the instant invention, the reaction can be carried out in a single stage process, either batchwise or continuously, without using excess alkali. If the operation is batchwise, the alkali must be added in increments along with the chlorine, so that the pH never exceeds 9. The final pH of the batch is adjusted to between 1.5 and 3.5 at which point the chlorinated cyanuric acid precipitates and can be recovered.

The process may also be carried out in a continuous single stage chlorination. In this process, the reaction zone is maintained at a pH of about 1.5 to 3.5 while the reactants are fed in and the products continuously removed. Because of the difficulty of controlling three streams of reactants and the desirability of maintaining the ratio of alkali to cyanuric acid most accurately, the alkali and cyanuric acid are preferably fed into the reaction mixture together, and the pH controlled by the rate at which the chlorine is added. The reaction mixture can be built up by starting with water in the reactor or with a batch chlorination ending in the desired pH range.

However, for optimum chlorine utilization, it is essential to operate the process in at least two stages. It has been discovered that chlorine absorption is more difficult at a pH of 2 to 3 than it is at higher pH levels, and that for optimum chlorine utilization, the process should involve a first stage in which a higher pH is maintained, partially chlorinating the material in this first stage, and a second stage in which the chlorination is completed while the reaction mixture is maintained at a pH of 1.5 to 3.5. The chlorine in the vent gases from the second stage chlorination, which may then be allowed to contain as much chlorine as desired, can be effectively utilized by feeding the vent gases with additional chlorine into the first stage.

In the first stage of the chlorination there is fed into the reaction zone cyanuric acid, the theoretical quantity of caustic alkali equivalent to the chlorine to be substituted, and sufficient chlorine to bring the pH into the range of 5 to 9. Product quality and yield are satisfactory at any pH below 9.0; however, if the first stage is run at pH's below 5.0, utilization of chlorine becomes inefficient.

Preferably, sufficient chlorine is added so that the pH of this first reaction zone is maintained between 6.5 and 8.5; in this region, small variations in the ratio of the reactant causes a very rapid change in the pH, so that this one parameter may be used to control the rate of addition of the feed materials. This same sensitivity is not observed above about pH 8.5, and falls off below pH 6.5 until a pH below about 3.5 is reached, when the sensitivity is again noted.

Another criterion in picking the actual operating pH for plant conditions is the matter of heat balance; it is desirable to equalize the heat developed in the two stages of the reaction, so that the design and operation of the necessary heat exchangers for maintaining the desired low temperature is simplified.

When making dichlorocyanuric acid and maintaining the pH of the reaction mixture between about 6 and 9, there is fed to the first stage of the reaction about half of the chlorine utilized. This chlorine is obtained partially from the vent gases from the second stage of the reaction and partially supplied as fresh chlorine. When making trichlorocyanuric acid, about 60% to 65% of the total chlorine is used in the first stage of the reaction when it is maintained at pH 6 to 9. While this tends to put a greater load on the cooling requirements of the first stage of the reaction, results are reasonably satisfactory. It has the advantage of reducing the proportion of chlorine which has to be reacted in the second stage, where chlorine absorption is slower.

Considering all the above factors, maintenance of a pH between 7.0 and 8.0 in the first stage is considered optimum.

The reaction mixture overflowing from the first stage of the chlorination is fed continuously into the second stage of the chlorination along with fresh chlorine. Here the chlorine feed is adjusted so that the pH is maintained at 1.5 to 3.5. In this pH range, the solubility of the dischloro- and trichlorocyanuric acids in the reaction liquor is low, and yet the absorption of chlorine is sufficiently rapid so that the chlorination goes essentially to completion with the precipitation of the chlorinated acids. At higher pH levels, the chlorocyanuric acids are sufficiently soluble to reduce the yield of solid product significantly. The product slurry is withdrawn continuously from this stage of the reactor, and the product separated from the liquor, washed and dried.

The chlorination reaction itself can be effectively run at any temperature above freezing up to about 40° C. However, it is preferred to maintain the temperatures below 20° C. to speed up chlorine absorption and minimize side reactions.

The chlorocyanuric acids produced in the final reaction zone are very stable and can be held there for several hours if necessary without adversely affecting the product, provided the pH and temperature of the second reaction zone are maintained within the preferred limits. Consequently, the holding time may vary from a few minutes to several hours. The minimum holding time is fixed by the slowest of several rate controlling factors which include (1) the rate at which chlorine can be absorbed, (2) the rate at which the chlorination reactions occur and the rate at which equilibrium between the solid and liquid phases in the reaction mixture can be established, and (3) the rate at which the heat of reaction can be removed. Of these factors, the rate at which the chlorination reactions occur is the least critical, since these reactions take place very rapidly in solution; the limiting factor in completing the reaction is the rate at which the reactants can be brought into solution and the solid products precipitated from the reaction liquor.

Chlorine absorption rate depends on the effectiveness of its dispersion in the liquid and the effectiveness of agitation. Low temperatures, high pH, and effective dispersion of the chlorine and agitation of the reaction mixture increase the rate of chlorine absorption.

It is desirable in order to get optimum speed of reaction to use finely ground cyanuric acid and mix it with the alkali to get either a finely dispersed slurry in the case of dichlorocyanuric acid, or a nearly clear solution in the case of trichlorocyanuric acid, and sufficient time should be allowed in the first reaction zone for dissolution of the reactants. However, a retention time of even as little as five minutes in the first stage is sufficient to produce satisfactory results.

In commercial practice, the retention time is really set by the cooling load and heat transfer requirements. In commercial equipment, the provision of sufficient heat transfer surface to maintain the temperature in the preferred range results in longer average retention time than is necessary to complete the reaction. In a plant design for a given production rate, the residence time therefore is set by the most economical balance between reactor size and heat transfer surface. Part of the heat transfer surface can be provided by continuously pumping part of the reaction mixture through an external heat exchanger and returning it to the reactor at a lower temperature than the temperature that is being maintained in the reaction zone.

The yields of chlorocyanuric acid based on cyanuric acid fed approach theoretical in the process of this invention, usually running above 90%. About 1% to 2% of the cyanuric acid fed is lost by side reactions; the other losses are due largely to the solubility of the end products in the reaction liquor. These latter losses can be kept to a minimum by cooling the completely chlorinated reaction mixture removed from the second reaction zone to a low temperature, preferably about 5° C., before separating the solid products from the reaction liquor.

Any strong alkali may be used in the process, but the alkali metal hydroxides are preferred because they do not cause frothing, as do the carbonates, and they are otherwise most economical. Of the caustic alkalis, caustic soda is preferred for cost reasons. The alkali is used in substantially theoretical quantities; the only alkali lost is the very small amount used up in the side reactions. In operating the process in two stages, the amount of chlorine absorbed is essentially equivalent to the alkali used. None needs to be lost in the overhead. When operating the process in a single stage, there is always some chlorine lost in the vent gases.

The following typical examples of the invention are given by way of illustration and not by way of limitation as defined in the claims.

*Example I*

This describes the production of dichlorocyanuric acid in a single stage, continuous chlorination.

A 0.5 liter cylindrical reactor was fabricated from 90 mm. O.D. Pyrex tubing 205 mm. in length. The reactor was spherical at the bottom and closed with a rubber stopper at the top. The feed slurry and chlorine inlet tubes, product outlet, pH electrodes and thermometer were all assembled as an integral part of the rubber stopper. A Dry Ice-acetone bath was used to maintain the reactor at 5° C. The feed slurry was introduced through a straight tube, extending close to the upper surface of the stirrer blade, by means of a Sigmamotor pump, model T-68. The chlorine was introduced through a tube drawn to a tip so that the chlorine impinged on the stirrer blade. The paddle shaped stirrer blade was rotated at about 1400 r.p.m. The pH measurements were made with a glass-calomel electrode assembly immersed in the reactor slurry. For the feed slurry, purified dry cyanuric acid was ground in a Mikro Pulverizer and then mixed with 7 weight percent sodium hydroxide solution to give a 2.02 mol ratio of caustic to cyanuric acid.

The reactor was filled with feed slurry and chlorine was added until the pH dropped to about 2.5. The continuous run was then started. The feed slurry was set at a constant rate and chlorine was fed at the rate required to maintain the pH at about 2.5. During the 70 minute run the reactor was held at 4–8° C. and the pH at 2.3–2.6. The product slurry removed amounted to 4.6 times the reactor contents so that the retention time was 15 minutes. Four samples of product taken as the run progressed showed available chlorine contents of 69.0, 70.7, 71.2 and 71.2%. The recovered product was equivalent to 94% of the cyanuric acid fed. The average chlorine vent rate was measured at 4% of the chlorine fed.

*Example II*

This describes the production of dichlorocyanuric acid in a two-stage, continuous chlorination.

Two reactors, similar to the one described in Example I, were used. Each reactor contained a side arm for continuous overflow of product slurry. Vent gas from the second stage reactor was passed to the first stage reactor through an inlet tube similar to the chlorine inlet tube. Vent gas from the first stage reactor was passed to a scrubber containing chloroform and then to a scrubber containing NaOH solution to measure $Cl_2$ and $CO_2$.

The run was started with a heel of water in the first stage reaction. The NaOH-cyanuric acid feed was prepared by mixing dry cyanuric acid with sufficient 6% NaOH solution to provide a NaOH/cyanuric acid mol ratio of 2.02. This slurry was fed at a constant rate of about 12 ml. per minute to the first stage reactor, and chlorine was fed to maintain a pH of 7. After the first stage reactor filled and started overflowing to the second stage reactor, chlorine was also fed to the second stage to maintain a pH of 2.5. The volumes of reaction mixture in the first and second stages were about 500 and 1250 ml., so that the average retention times were about 42 and 104 minutes, respectively.

After about three hours, both reactors were operating at essentially steady-state conditions, which were a temperature of 15° C. and pH of 7.0 and 2.5. During the succeeding period of 3 hours and 20 minutes while these conditions were maintained, the amount of cyanuric acid fed to the first stage and the product overflowed from the second reactor were measured. The product slurry was filtered at essentially the operating temperature of 15° C. and 292 grams of product on the dry basis were recovered. This product contained 71% available chlorine showing it was essentially pure dichlorocyanuric acid. The yield of chlorinated cyanuric acid was 90%, based on the 204 grams of cyanuric acid fed. If the product slurry had been cooled to 5° C. before filtering, an additional 5 grams of product would have been recovered and the yield would have been 92%. The losses were due almost entirely to the solubility of dichlorocyanuric acid in the mother liquor. The vent gas and reaction liquors contained $CO_2$ equivalent to only 0.1% of the total cyanuric acid fed, indicating that very little cyanuric acid was decomposed by side reactions. The vent gas contained only 0.01% of the $Cl_2$ fed, showing essentially 100% chlorine utilization in the reactors.

*Example III*

This describes the production of trichlorocyanuric acid in a two-stage, continuous chlorination.

Equipment and operating procedure was similar to that used in Example II. The NaOH-cyanuric acid mol ratio of the feed was 3.00. This mixture was fed at a rate of about 13.5 ml. per minute to the first stage reactor. The average retention times were about 37 and 93 minutes in the first and second stages, respectively. The pH in the first stage was held at 9.0 and in the second stage at 2.5 by regulating the chlorine feed to each. The temperature in each was held at 15° C.

During a period of about 3 hours at essentially steady-state conditions, 170.5 grams of cyanuric acid were fed to the first stage and the product slurry overflowed from the second stage, after filtering, gave 259 grams of product on the dry basis. This product contained 89% available chlorine showing it was essentially pure TCCA. The yield of chlorinated cyanuric acid was 87%, based on the cyanuric acid fed. If the product slurry had been cooled to 5° C. before filtering, the yield would have been 88%. The vent gas and reaction liquors contained $CO_2$ equivalent to only 0.9% of the cyanuric acid fed indicating that little cyanuric acid was decomposed by side reactions. The vent gas contained only 0.8% of the chlorine fed.

It may be noted that only the theoretical amount of NaOH was used, with high pH in the first stage.

*Example IV*

This describes the production of trichlorocyanuric acid, with short retention time and low pH.

Equipment and operating procedure were similar to that used in Example II. The NaOH/cyanuric acid mol ratio of the feed was 3.03. Average retention time was 22 and 56 minutes in the first and second stages, respectively. The pH in the first stage was maintained at 5.0, in the second stage at 2.5. The temperature was held at 15° C.

During the run, 198 grams of cyanuric acid were fed in; 318 grams of trichlorocyanuric acid were recovered, with an average available chlorine content of 91.5%. This represents a 91% yield. $CO_2$ in the vent gases amounted to 0.5% of the cyanuric acid fed, and about 7.8% of the product was lost due to solubility in the mother liquor.

*Example V*

This example is similar to Example IV, with much longer retention times to show the slight effect of such longer retention time.

This example was run exactly as Example IV, but with retention times of 58 minutes in the first stage and 147 minutes in the second (almost three times the retention time of Example IV). Although the run was prolonged somewhat, only 133.1 grams of cyanuric acid were fed through during the measured runs. Product yield was 85.2% of material with 90.5% available chlorine; only 0.2% of the cyanuric acid appeared as $CO_2$ in the vent gases.

*Example VI*

This example shows the results obtained in a trichlorocyanuric acid batch chlorination using a 33% excess of NaOH (4 mols per mol of cyanuric acid). It has been found necessary to use such an excess in a batch chlorination to avoid producing an under-chlorinated product except on a small laboratory scale.

A reactor similar to that described in Example I was used, with a working volume of about 1400 ml. An aqueous solution containing 58.4 grams of cyanuric acid and sufficient 6% NaOH to give an NaOH/cyanuric acid ratio of 4.0 was placed in the reactor. Chlorine was fed to the reactor for a period of 4.5 hours and the temperature was held at 15–20° C. by means of a cooling bath. The pH ranged from 12.3 at the start to 2.7 at the end of the batch. Samples of the reaction mixture were withdrawn periodically and analyzed for $CO_2$ content. Vent gas from the reactor was passed through a scrubber containing chloroform, then through one containing dilute NaOH, and then into a gas collecting bottle. This vent collection system was used to measure chlorine, $CO_2$, and nitrogen in the reactor vent gas.

At the end of the batch the slurry was filtered and the product was dried. The product amounted to 57.2 grams and contained 89% available chlorine. The yield based on cyanuric acid was thus about 55%. This could have been increased slightly by cooling the slurry before filtering. For the overall batch, $CO_2$ equivalent to about 19% of the CA was formed. Analysis of the vent gas showed that nitrogen equivalent to about 17% of the cyanuric acid was evolved. Nitrogen trichloride equivalent to 1.5% of the cyanuric acid was found. This shows that at least 19% of the cyanuric acid was decomposed by side reactions. Furthermore, the $CO_2$ content of the periodic samples of reaction liquor showed that most of the total $CO_2$ found was formed at a pH above 9.0.

The examples of the invention illustrate its advantages, but, of course, the invention is not restricted thereto, but is defined in the claims. It will be noted that continuous operation is permitted, very high yields based on cyanuric acid are obtained, and the process is operable with almost quantitative utilization of both alkali and chlorine to yield products which contain the theoretical percentages of active chlorine.

What is claimed is:

1. The method of making a compound of the group consisting of dichlorocyanuric acid, trichlorocyanuric acid and mixtures thereof, which comprises feeding cyanuric acid, aqueous alkali in a molar ratio to the cyanuric acid corresponding to the number of chlorine atoms to be attached to the cyanuric acid, and a separate stream of chlorine continuously to an aqueous reaction zone in which the pH is maintained between 5 and 9 and the temperature between 5° C. and 40° C., continuously withdrawing a portion of the reaction mixture and feeding it, with additional chlorine, to a second reaction zone in which the pH is maintained between 1.5 and 3.5 and the temperature between about 5° C. and 20° C., continuously withdrawing reaction product from the second reaction zone and recovering the precipitated chlorinated cyanuric acid from the withdrawn reaction mixture.

2. The method of claim 1 in which the pH of the first reaction zone is maintained between about 6 and 9 whereby the heat load between the two reaction zones is equalized.

3. The method of making dichlorocyanuric acid which comprises feeding a stream of an aqueous slurry, containing cyanuric acid and two mols of caustic soda per mol of cyanuric acid, and a second stream of chlorine continuously to an aqueous reaction zone in which the pH is maintained between 5 and 9 and the temperature between 5° C. and 40° C., continuously withdrawing a portion of the reaction mixture and feeding it, with additional chlorine, to a second reaction zone in which the pH is maintained between 1.5 and 3.5 and the temperature between about 5° C. and 20° C., continuously withdrawing reaction product from the second reaction zone and recovering the precipitated dichlorocyanuric acid from the withdrawn reaction mixture.

4. A continuous method of preparing trichlorocyanuric acid which comprises feeding an aqueous solution, containing cyanuric acid and 3 mols of caustic soda per mol of cyanuric acid, and a second stream of chlorine continuously into an aqueous reaction zone in which the pH is maintained between 5 and 9 and the temperature between about 5° C. and 40° C., continuously withdrawing a portion of the reaction product and feeding it continuously, with additional chlorine, to a second reaction zone in which the pH is maintained between 1.5 and 3.5 and the temperature between about 5° C. and 20° C., continuously withdrawing reaction product from the second reaction zone and recovering the precipitated trichlorocyanuric acid from the withdrawn reaction product.

References Cited in the file of this patent

UNITED STATES PATENTS

| | | |
|---|---|---|
| 2,472,361 | Arsem | June 7, 1949 |
| 2,913,460 | Brown et al. | Nov. 17, 1959 |

FOREIGN PATENTS

| | | |
|---|---|---|
| 219,930 | Australia | Jan. 22, 1959 |
| 565,256 | Canada | Oct. 28, 1958 |
| 1,149,758 | France | July 22, 1957 |

OTHER REFERENCES

Hands et al.: Journal of the Society of Chemical Industry, vol. 67, pp. 66–68 (1948).